April 4, 1944.  A. B. FULLER  2,346,070
FILM ADVANCING ASSEMBLY
Filed July 24, 1941
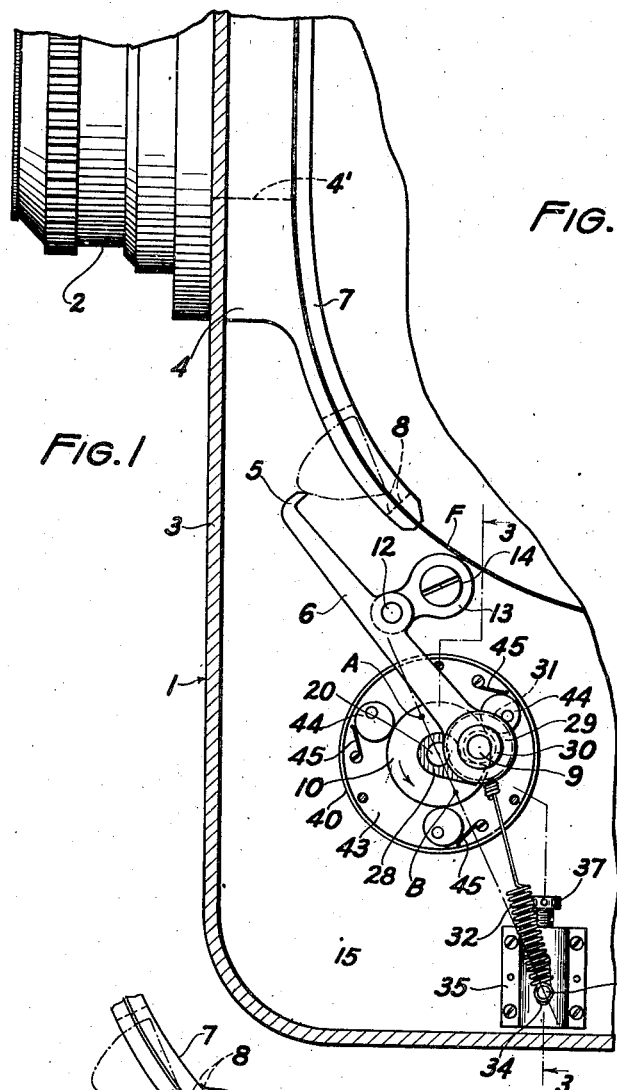
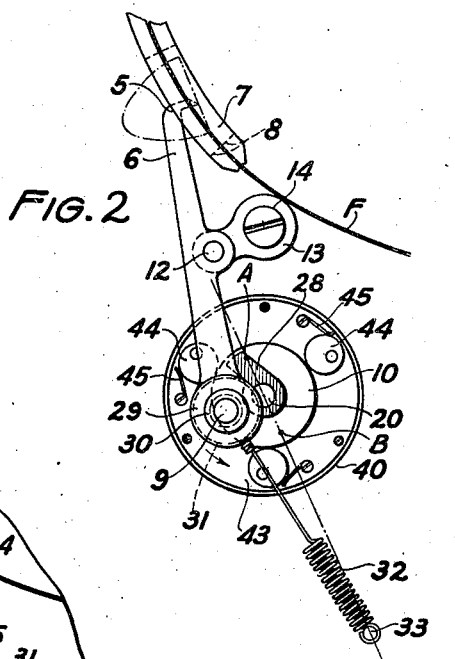
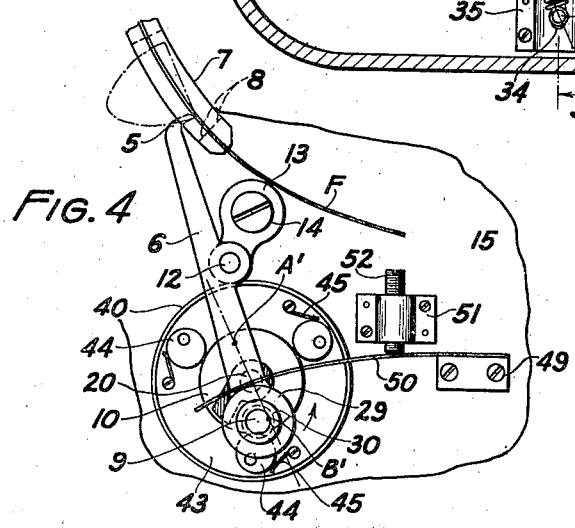
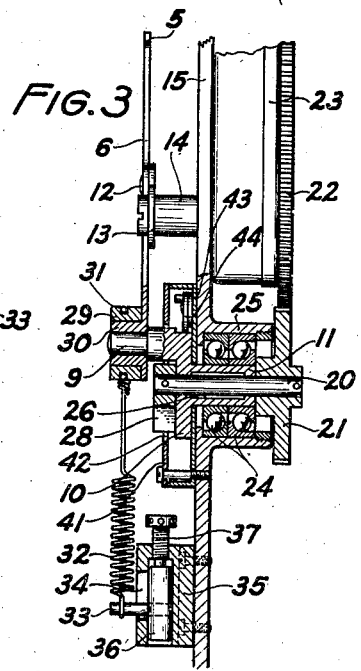
ALBERT B. FULLER
INVENTOR
BY George A. Gillette, Jr.
ATTORNEYS Patented Apr. 4, 1944

2,346,070

UNITED STATES PATENT OFFICE 2,346,070

FILM ADVANCING ASSEMBLY

Albert B. Fuller, Rochester, N. Y., assignor to Eastman Kodak Company, Rochester, N. Y., a corporation of New Jersey Application July 24, 1941, Serial No. 403,809

6 Claims. (Cl. 88—18.4)

The present invention relates to a film-advancing assembly and more particularly to the rapid advancement of a motion picture film strip having perforated margins.

While various arrangements and means for rapidly advancing a film strip are already known, such arrangements are not entirely satisfactory because of complicated construction, noise of operation, and/or excessive wear upon the parts.

The primary object of the present invention is the provision of a film-advancing assembly including a spring member in which energy is stored by a driving means and which energy is delivered to a film-engaging means for rapid movement thereof independently of the driving means to advance the film.

Another object of the invention is the provision of a film-advancing assembly including a film-engaging means having a part movable in a circular path and upon which a spring effort is exerted and of a driving means having a crank arm for moving said part relatively of the point of application of the spring member, first to store energy therein and after the point of application of the spring member crosses the center line between the axis of the driving member and said part of the film-engaging means permitting the energy stored in the spring to move said film-engaging means rapidly and independently of said crank arm.

A further object of the invention is the coaxial arrangement of a driven member for the film-engaging means and of the driving means therefor according to the invention.

Other and further objects of the invention will be suggested to those skilled in the art by the description which follows.

The aforementioned objects of the invention are embodied in a film-advancing assembly including a film-engaging means for intermittently advancing a film and having a part movable in a circular path, a spring member for exerting an effort upon said part, and a driving means rotatable about an axis and having a crank arm for moving said part relatively of the point of application of said spring member and to store energy in said spring member until the point of application thereof crosses the center line between said axis and the part of said film-engaging means whereupon the stored energy acts to move said part and the film-engaging means rapidly and independently of the crank arm of said driving means for intermittent advancement of the film.

Reference is hereby made to the accompanying drawing wherein similar reference characters designate similar elements and wherein:

Fig. 1 is a fragmentary side elevation of a motion picture camera equipped with a film-advancing assembly according to the invention.

Fig. 2 is a side elevation of the film-advancing assembly during movement of the film thereby.

Fig. 3 is a transverse section through the film-advancing assembly taken on the line 3—3 of Fig. 1.

Fig. 4 is a side elevation of a modified form of the film-advancing assembly of the invention.

While the invention is illustrated and described with respect to a motion picture camera, it is to be understood that such film-advancing assembly may be used to good advantage in any type of apparatus requiring rapid advancement of a film strip or may be used for motion picture projectors, printers, etc.

In the illustrated embodiment of the invention, the motion picture camera may comprise a casing 1 carrying a photographic objective 2 on the casing front wall 3. A supporting block 4 within casing 1 is provided with an exposure opening 4' in alignment with the photographic objective 2. The rear face of supporting block 4 is curved and a curved pressure pad 7 is resiliently urged thereagainst in any known manner to form a guideway or gate for the film F.

The film-engaging means for intermittently advancing the film F may be of any standard form such as the claw type or intermittent sprocket type. As shown, the film-engaging means comprises a claw arm 6 having a claw tooth 5 on one end thereof and for engaging the film perforations. The extension of supporting block 4 and pressure pad 7 are provided with claw slots 8 into which the claw tooth 5 may move for engagement of the perforations of film strip F. The claw arm 6 is intermediately pivoted at 12 to one end of a link 13 which is pivotally mounted upon a post 14 extending from the mechanism plate 15. The other end of claw arm 6 carries a part movable in a circular path or as shown is provided with a bearing sleeve 30 upon which a bearing collar 29 is rotatably mounted. The film-engaging means may also include a driven member composed of a flange 10 carrying a crank pin 9 which fits into said bearing sleeve 30, and a bearing sleeve 11 which is rotatably mounted in ball bearing assemblies 24 within a sleeve 25 on the mechanism plate 15.

A driving means for the film-engaging means may comprise a shaft 20 journaled in bearing sleeve 11 and carrying on one end a crank arm 28 for engagement with said crank pin 9. A gear 21 is pinned to the other end of shaft 20 and meshes with a pinion gear 22 mounted upon the casing 23 of a spring motor of known form.

Upon operation of the spring motor, shaft 20 will be driven through gears 21 and 22 and crank arm 28 will abut against crank pin 9 to move the same in a circular path and to move claw arm 6 so that claw tooth 5 will move in a semi-elliptical path as indicated by the dot-dash lines in Figs. 1, 2 and 4. The movement of the claw tooth 5 along the flat side of its path within the film gate advances the film F a predetermined amount, such as a film frame, whereupon the claw tooth 5 is retracted from the film and moved in an elliptical path back into engagement with the next perforation of the film.

The desired rapid movement of the film or film-engaging means is accomplished by means of a spring member in which energy is stored during the return or idle movement of the claw arm 6 and which energy is released when the claw tooth 5 enters into engagement with the film at the beginning of the film-advancing stroke for rapid movement of the film and claw arm independently of the driving means. Such a spring member may be provided in a variety of ways, two of which are shown herein.

In one form, the spring member may comprise a coil spring 32 having one end encircling the bearing collar 29 within a groove 31 therein and having its other end connected to a stationary pin 33. Alternatively, the spring member may comprise a leaf spring 50 mounted at one end upon the mechanism plate 15 by screws 49 and having its other end bearing against the collar 29 on the claw arm 6.

The effort exerted by or tension in the spring members may be determined by the selection of a coil spring or leaf spring having the desired characteristics or an adjustable means may be provided to vary the normal tension in the spring member. Such an adjustable means may comprise a bracket 35 attached to mechanism plate 15 and within which a block 36 may slide, the pin 33 being mounted in said block 36. An adjusting screw 37 is threaded into one end of bracket 35 and bears against one end of block 36 so that the latter may be moved to any desired position and to place the necessary tension upon the coil spring 32. The adjustable means for the leaf spring 50 may comprise a bracket 51 mounted on mechanism plate 15 and a set screw 52 threaded through bracket 51 and having one end bearing upon the leaf spring 50 to move it so as to vary the pressure of the leaf spring 50 against the bearing collar 29 of the film-engaging means.

Under some circumstances it may be necessary or desirable to prevent the backward movement or backlash of the film-engaging means. This may be accomplished by providing a one-way clutch mounted within the casing 40 having a cover 41 which is provided with an opening 42 through which the crank arm 28 of the driving means extends. A plurality of disks 44 are eccentrically mounted upon the bottom wall 43 of casing 40 and springs 45 bear upon the edge of disks 44 to urge them against the periphery of flange 10 of the driven member. As a result, flange 10 can only be rotated in one direction as indicated by the arrows on Figs. 1, 2 and 4 and any tendency for reverse movement of said flange 10 will be prevented by the snubbing action of the spring-pressed disks 44.

The operation of the film-advancing assembly according to the invention will now be described:

The cycle of the film-advancing assembly has two phases, one in which energy is being stored in the spring member by rotation of the part of the film-engaging means for a portion of its circular path and the other being delivery of the energy from the spring member to the film-engaging means for rapid advancement of the film. The energy-storing phase is illustrated in Fig. 1 while the energy delivery phase is illustrated in Figs. 2 and 4.

The driving means including shaft 20 and crank arm 28 is rotated continuously by the spring motor in the manner previously described. Crank arm 28 is adapted to strike or abut against the crank pin 9 of the driven member and to carry such crank pin 9, the bearing collar 29, and the lower end of claw arm 6 along with it in a circular path. At the same time the coil spring 32 is resisting or opposing such movement and in doing so is placed under increased tension or is caused to store potential energy by reason of such movement in the circular path of the bearing collar 29. Coil spring 32 continues to be increasingly tensioned until such time as the point of application of the spring member crosses the center line between the axis of the driving means and the crank pin 9 or bearing collar 29 of the film-engaging means. The change-over from the energy storage to the energy delivering phase occurs when the point of spring application crosses the dead center line of the direction of spring effort and between the axis of the driving means and center of the crank pin 9. This dead center point is designated as A and A' in Figs. 1 and 4, respectively.

As soon as the point of application for the spring member crosses the center line between the axis of the driving means and center of the crank pin 9, the energy stored in the spring member then becomes effective to accelerate the crank pin 9 and move it ahead of the crank arm 28, see Figs. 2 and 4. As a result, the film-engaging means is now moved very rapidly and the claw tooth 5 is moved along the film guide-way formed by the extension of supporting block 4 and the pressure pad 7 to the bottom of the stroke of the claw arm 6 and claw tooth 5. In other words, the film F is advanced rapidly and in proportion to the energy stored in the spring member and quite independently of the angular velocity of the crank arm 28. It will also be evident that by adjusting or increasing the tension placed upon the spring member, the rapidity of film movement can be varied.

The circularly moving part of the film-engaging means is moved by the spring member until the point of application of the spring member coincides with the dead center line through the axis of the driving member or until the center line of coil spring 32 coincides with the center line through the axis and the stationary pin 33. The crank pin 9 may then rest momentarily and wait for the crank arm 28 to catch up with it or to again contact with the crank pin 9. Under these conditions there may be some tendency for the flange 10 and crank pin 9 to oscillate but the one-way clutch means or the eccentric disks 44 prevent any reverse rotation of crank pin 9 and flange 10. When the crank arm 28 again engages and moves crank pin 9, the spring member is again stretched by the circular movement of crank pin 9 and the energy-storing phase of the next cycle is under way.

The operation of the modification of the invention shown in Fig. 4 is very similar in effect. In other words, the leaf spring 50 is shown to be moving the crank pin to the lower dead center point B' ahead of the crank arm 28. As shown in Fig. 4, the energy delivery phase of the cycle is nearing completion. Subsequently, the crank pin 9 is moved by crank arm 28 to flex the leaf spring 50 and to store energy therein. When the point of application of the spring member crosses the center line between the axis of the driving means and the center of crank pin 9 or passes the dead center point A' the energy so stored in spring 50 is delivered up and rapidly moves the film-engaging means and its circularly moving part or crank pin 9 ahead of the crank arm 28 of the driving means. At this time the claw arm 6 is moved rapidly and independently of the driving means so that the film in the guideway or gate is rapidly advanced one stroke or frame.

As is well understood in the art, the advancement of the film may be at such a rapid rate that it is not necessary to provide a shutter for the apparatus. Furthermore, other modifications of the film-engaging means and spring member therefor may be devised to perform or accomplish the rapid advancement of the film independently of the driving means in the manner disclosed herein.

Having now particularly described my invention, what I desire to secure by Letters Patent of the United States and what I claim is:

1. In a film advancing assembly, the combination with a frame, a film engaging means for intermittently advancing a film and having a part rotatable in a circular path, and a spring member attached to said frame and for exerting an effort upon said part, of a driving means rotatable about an axis and having a crank arm for displacing said part with respect to the point of application of said spring member, said part, spring member and driving means being relatively arranged to store energy in said spring member until said point of application thereof crosses the center line between said axis and the part of said film engaging means whereupon the energy so stored acts to move said part and film engaging means rapidly and independently of the crank arm of said driving means for intermittent advancement of said film.

2. In a film advancing assembly, the combination with a frame having a guideway for a film strip, a film engaging means having a part rotatable in a circular path and for advancing a film strip during one portion of the movement of said part and ineffective to advance a film strip during the other portion of the movement of said part, and a spring member attached to said frame and for exerting an effort upon said part, of a driving means rotatable about an axis and having a crank arm for displacing said part with respect to the point of application of said spring member and through the ineffective portion of its path, said part, spring member and driving means being relatively arranged to store energy in said spring member until the point of application thereof crosses the center line between said axis and said part whereupon the energy so stored acts to move said part rapidly through the film advancing portion of its movement and independently of said crank arm.

3. In a film advancing assembly, the combination with a frame, a film engaging means for intermittently advancing a film and having a bearing portion, a driven member rotatably mounted in said frame, having a crank pin which is journaled in said bearing portion and which is rotatable in a circular path about an axis, and a spring member attached to said frame and for exerting an effort upon said bearing portion, of a driving means journaled within said driven member co-axially therewith and having a crank arm abutting and moving said crank pin for storing energy in said spring member until the point of application thereof crosses the center line between said axis and said crank pin whereupon the energy so stored acts to move said bearing portion and film engaging means rapidly and independently of said crank arm.

4. In a film advancing assembly, the combination with a frame, a film engaging means for intermittently advancing a film and having a part rotatable in a circular path, and a spring member attached to said frame and for exerting an effort upon said part, of a driving means rotatable about an axis and having a crank arm for abutting and moving said part relatively of the point of application of said spring member and to store energy in said spring member until said point of application thereof crosses the center line between said axis and the part of said film engaging means whereupon the energy so stored acts to move said part and film engaging means rapidly and independently of the crank arm of said driving means for intermittently advancement of said film and adjustable means on said frame for varying the normal tension in said spring member.

5. In a film advancing assembly, the combination with a frame having a guideway for a film strip, a film engaging means for intermittently advancing a film and having a part rotatable in a circular path, and a coil spring member having one end connected to said frame and its other end connected to said part and for exerting a resilient pull thereon, of a driving means rotatable about an axis and having a crank arm for displacing said part with respect to the point of application of said spring member, said part, spring member and driving means being relatively arranged to increase the tension in said coil spring member until the center line of said coil spring crosses the center line between said axis and said part whereupon the tension in said coil spring acts to move said part and film engaging means rapidly and independently of the crank arm of said driving means for rapid advancement of a film strip.

6. In a film advancing assembly, the combination with a frame having a guideway for a film strip, a film engaging means for intermittently advancing a film and having a part rotatable in a circular path, and a leaf spring member having one end mounted upon said frame and having its free end engaging said part to exert a resilient effort thereon, of a driving means rotatable about an axis and having a crank arm for displacing said part with respect to the point of application of said spring member, said part, spring member and driving means being relatively arranged to increase the tension in said spring member until the point of application thereof crosses the center line between said axis and said part whereupon the tension in said spring member acts to move said part and film engaging means rapidly and independently of the crank arm of said driving means for rapid advancement of a film strip.

ALBERT B. FULLER.